US012649696B2

(12) United States Patent
Planckeel et al.

(10) Patent No.: US 12,649,696 B2
(45) Date of Patent: Jun. 9, 2026

(54) FIBROUS BLANK WITH AT LEAST ONE DISCONNECTION HAVING AN ALTERNATION OF WEAVING

(71) Applicant: SAFRAN CERAMICS, Le Haillan (FR)

(72) Inventors: Aline Planckeel, Moissy Cramayel (FR); Marie Lefebvre, Moissy Cramayel (FR); Thierry Guy Xavier Tesson, Moissy Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 19/131,452

(22) PCT Filed: Nov. 21, 2023

(86) PCT No.: PCT/FR2023/000178
§ 371 (c)(1),
(2) Date: May 20, 2025

(87) PCT Pub. No.: WO2024/110704
PCT Pub. Date: May 30, 2024

(65) Prior Publication Data
US 2026/0008727 A1     Jan. 8, 2026

(30) Foreign Application Priority Data
Nov. 21, 2022    (FR) ...................................... 2212077

(51) Int. Cl.
C04B 35/00      (2006.01)
B29C 70/24      (2006.01)
(Continued)

(52) U.S. Cl.
CPC .............. C04B 35/80 (2013.01); B29C 70/24 (2013.01); C04B 35/62844 (2013.01);
(Continued)

(58) Field of Classification Search
CPC ... C04B 35/80; C04B 35/62844; B29C 70/24; D03D 25/005
See application file for complete search history.

(56) References Cited

U.S. PATENT DOCUMENTS

2014/0349538 A1* 11/2014 Marchal .................. F01D 5/147
156/227

FOREIGN PATENT DOCUMENTS

FR    3 047 744 A1    8/2017
FR    3 116 753 A1    6/2022
(Continued)

OTHER PUBLICATIONS

International Preliminary Report on Patentability and the Written Opinion of the International Searching Authority as issued in International Patent Application No. PCT/FR2023/000178, dated May 27, 2025.
(Continued)

*Primary Examiner* — Mathieu D Vargot
(74) *Attorney, Agent, or Firm* — CUSHMAN PARTNERS LLC

(57) ABSTRACT
A fibrous blank produced by weaving and including at least one first disconnection, the first disconnection separating first and second woven portions in the blank, wherein the fibrous blank has an alternation between a first weaving plane and a second, different weaving plane.

12 Claims, 6 Drawing Sheets

(51) Int. Cl.

| | | |
|---|---|---|
| *C04B 35/628* | (2006.01) | |
| *C04B 35/80* | (2006.01) | |
| *D03D 25/00* | (2006.01) | |
| *B29K 105/08* | (2006.01) | |
| *B29L 31/08* | (2006.01) | |

(52) U.S. Cl.
CPC .... *D03D 25/005* (2013.01); *B29K 2105/0845* (2013.01); *B29L 2031/082* (2013.01); *C04B 2235/5256* (2013.01); *D10B 2505/02* (2013.01)

(56) References Cited

FOREIGN PATENT DOCUMENTS

| | | | |
|---|---|---|---|
| RU | 2382206 | * | 2/2010 |
| WO | WO 2006/136755 | A2 | 12/2006 |
| WO | WO 2013/088040 | A2 | 6/2013 |

OTHER PUBLICATIONS

International Search Report as issued in International Patent Application No. PCT/FR2023/000178, dated Feb. 21, 2024.

* cited by examiner

[Fig. 1]
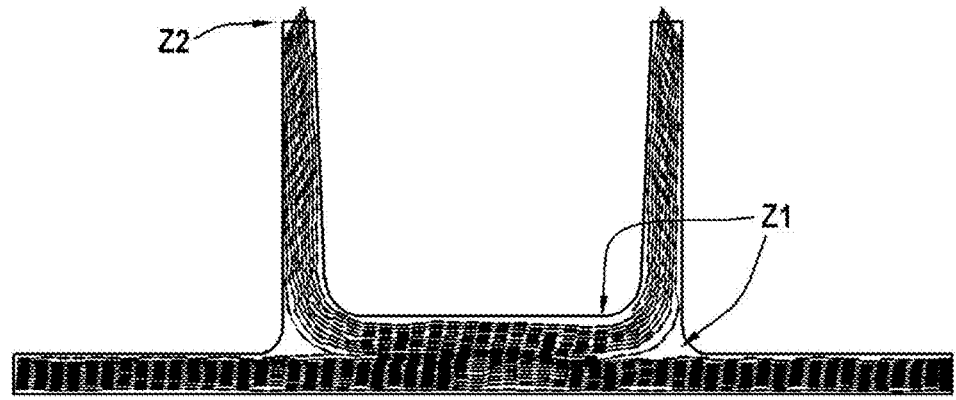
[Fig. 2]
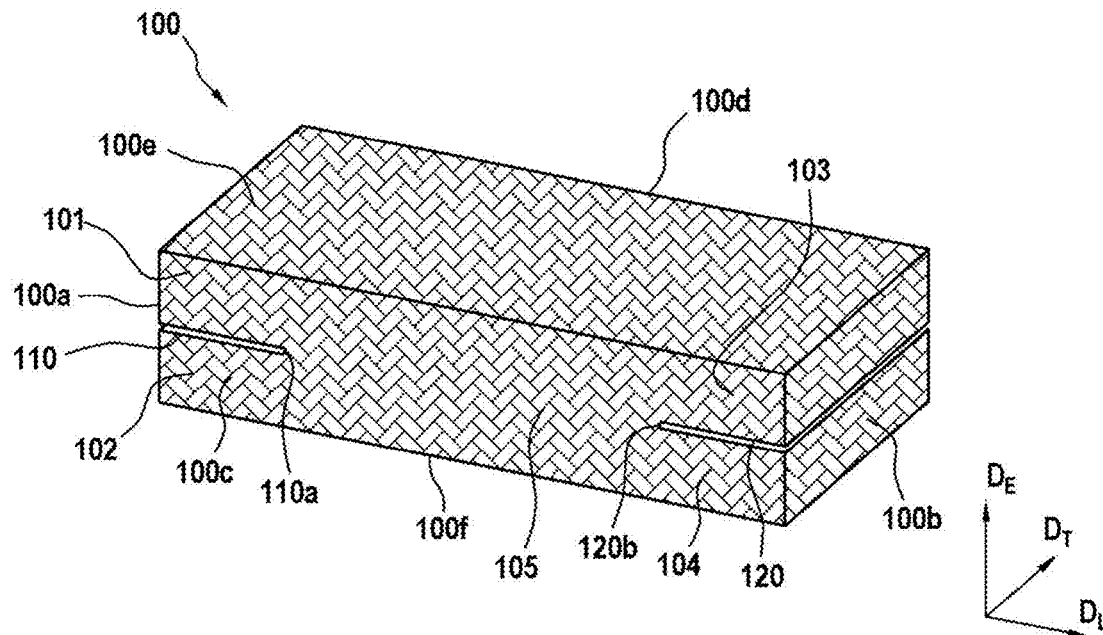

[Fig. 3]
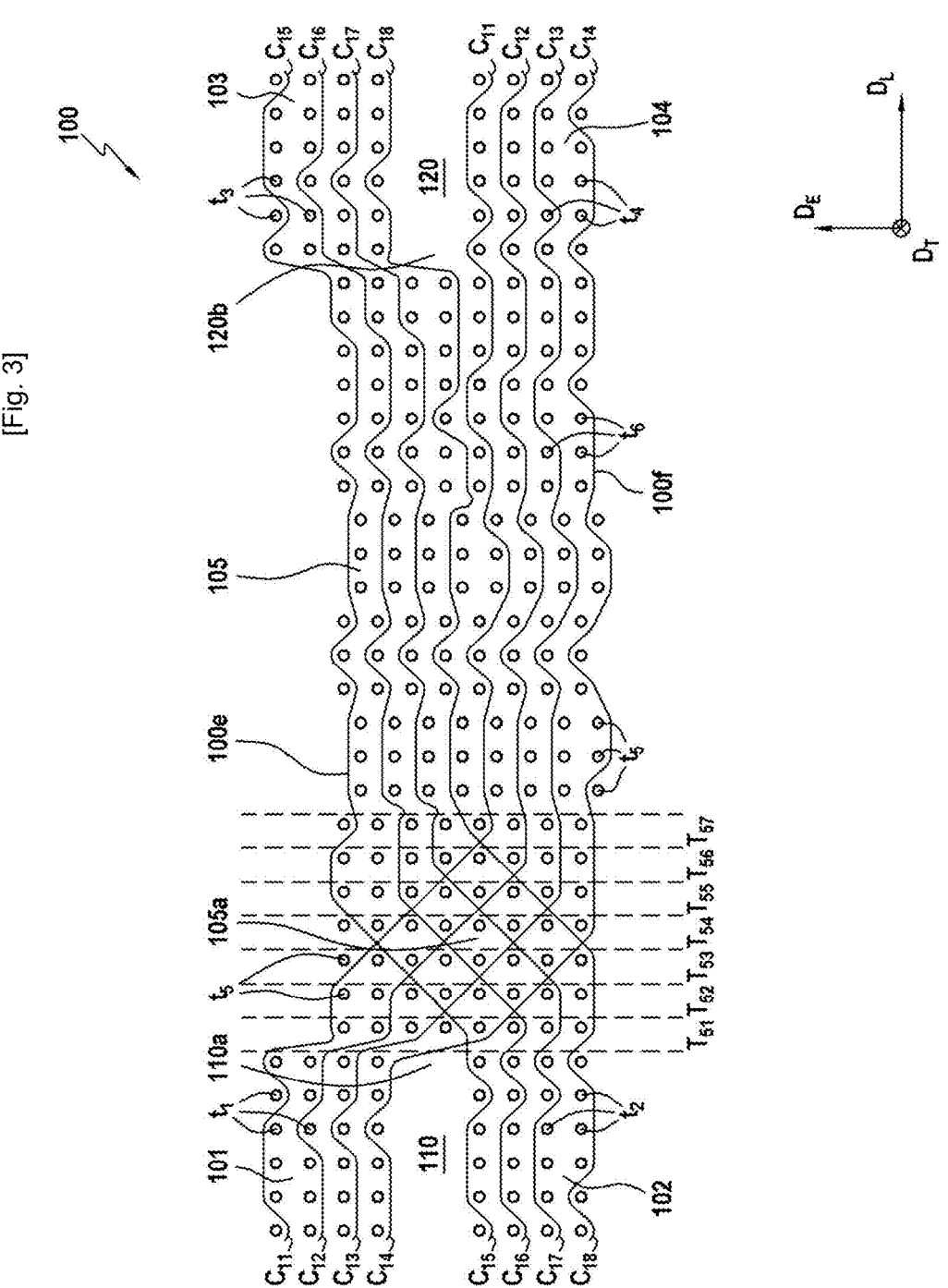

[Fig. 4]
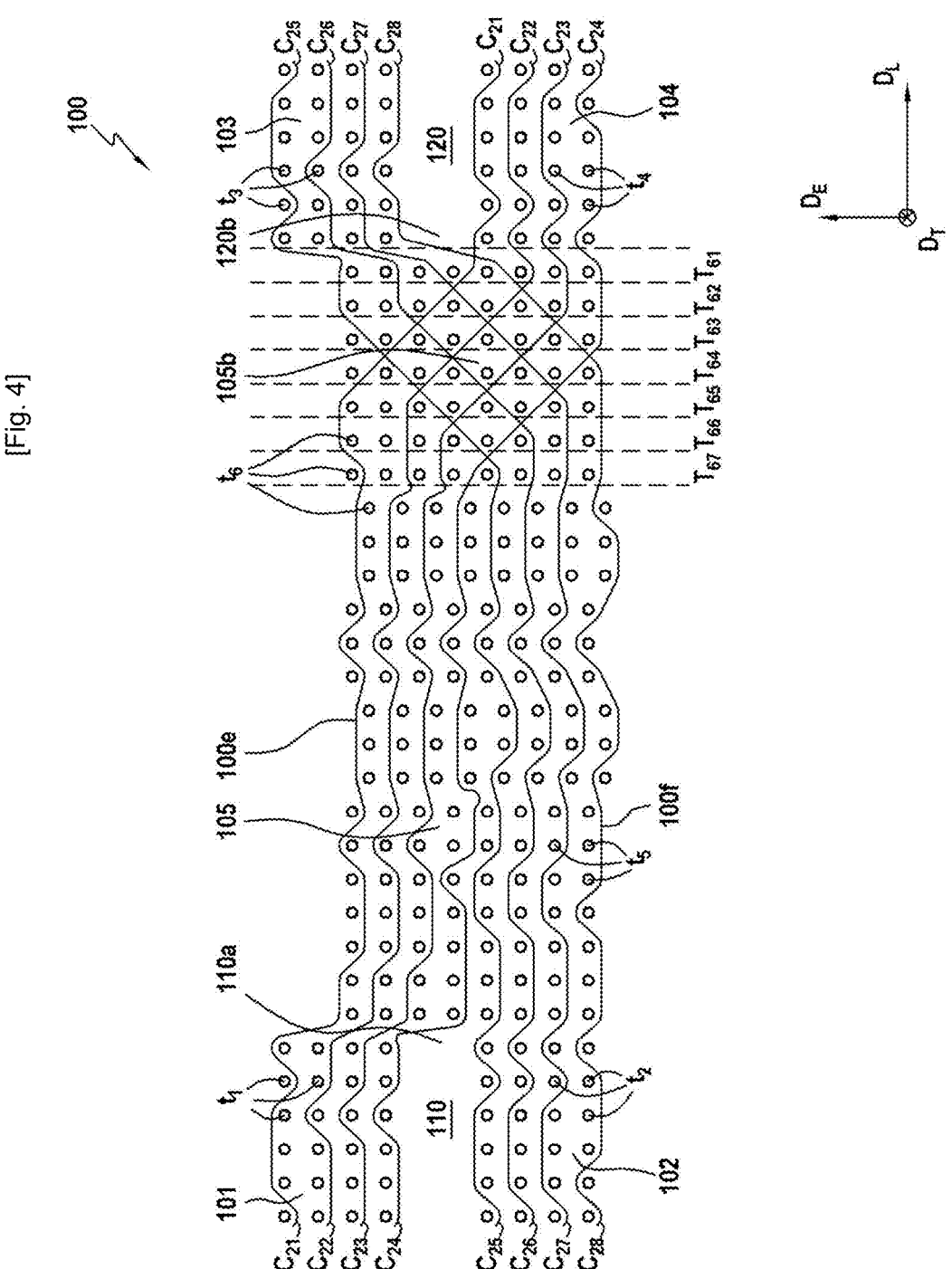

[Fig. 5]
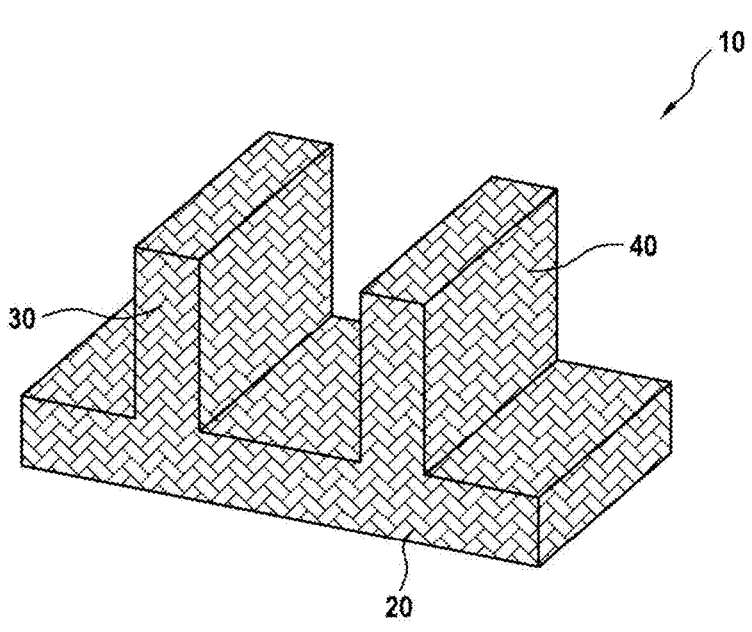
[Fig. 6]
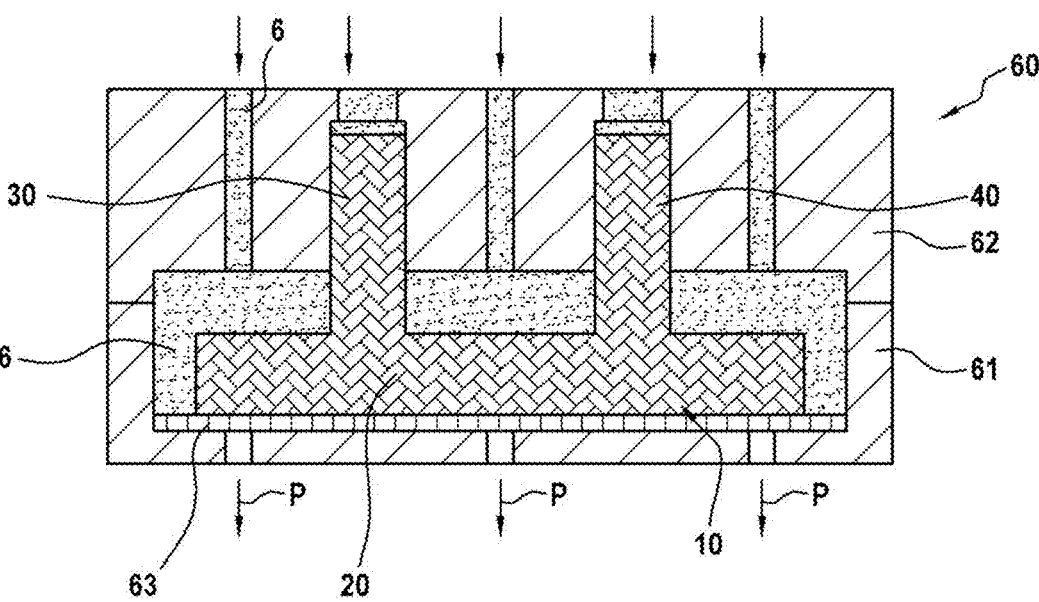

[Fig. 7]
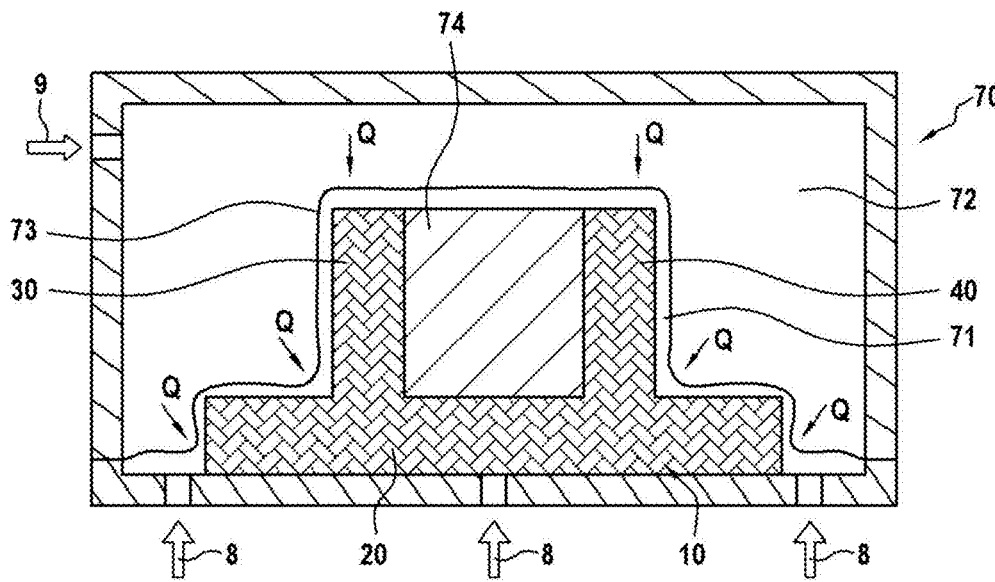
[Fig. 8]
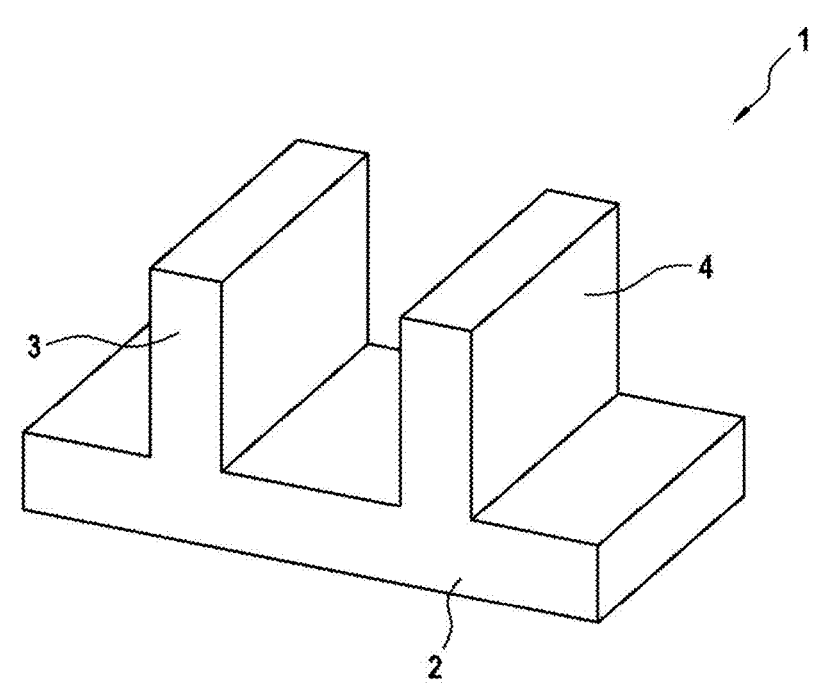

[Fig. 9]
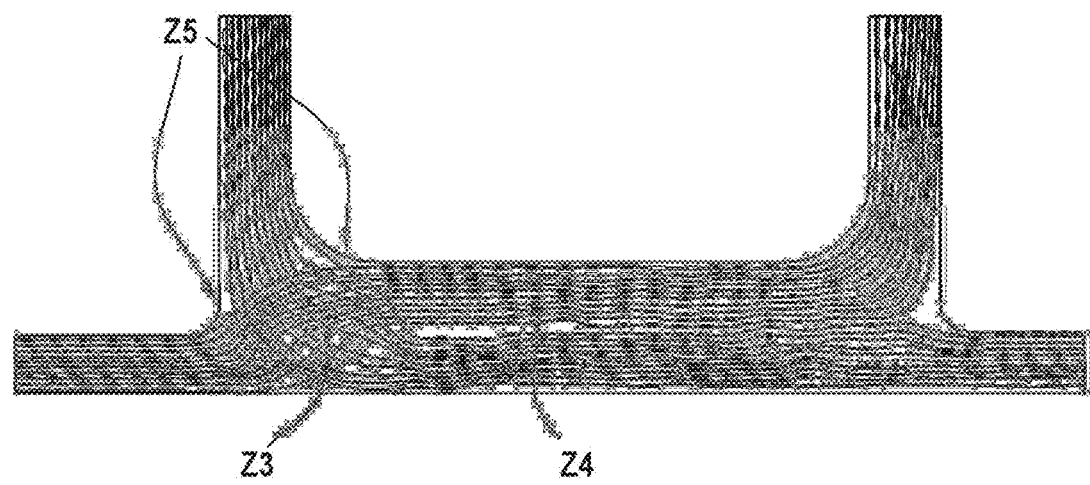

FIBROUS BLANK WITH AT LEAST ONE DISCONNECTION HAVING AN ALTERNATION OF WEAVING

CROSS-REFERENCE TO RELATED APPLICATIONS

This application is the U.S. National Stage of PCT/FR2023/000178, filed Nov. 21, 2023, which in turn claims priority to French patent application number 22 12077 filed Nov. 21, 2022. The content of these applications are incorporated herein by reference in their entireties.

TECHNICAL FIELD

The invention relates to a fibrous blank having at least one disconnection. The invention relates, for example, to a fibrous blank intended to form the fibrous reinforcement of a turbomachine part, and in particular an inter-blade platform or a turbomachine ring sector.

PRIOR ART

In order to obtain lightweight turbomachine parts with excellent thermomechanical properties, parts made of composite materials are produced in a well-known manner, that is to say parts comprising a fibrous reinforcement densified by a matrix. The use of composite materials contributes to optimizing the performance of the turbomachine, in particular by reducing the overall mass of the turbomachine, which contributes to a reduction in fuel consumption and therefore to a significant reduction in pollutant emissions.

Moreover, ceramic matrix composite materials can withstand temperatures ranging from 600° C. to 1400° C. Due to their better resistance to high temperatures, ceramic matrix composite materials require less cooling. Since this cooling conventionally comes from a draw in the compressor, which impacts the efficiency of the turbomachine, composite materials therefore allow to further improve engine efficiency and further reduce fuel consumption.

In particular, it is known to produce the fibrous blank of the part by three-dimensional weaving on a jacquard-type loom, said blank then being shaped to obtain a fibrous preform of the part to be produced, which will be densified by the matrix.

The creation of a disconnection when weaving a fibrous blank is well known. Such a disconnection allows to separate two portions of the fibrous blank, for example by deploying one of the portions of the fibrous blank. However, composite material parts comprising such a portion deployed by means of a disconnection have weak areas without fibers and consisting only of matrix, and may have unwanted tensions in the fibers.

For example, to produce parts comprising a base from which "legs" extend, such as an inter-blade platform or a n-shaped turbine ring sector, a flat fibrous blank is woven according to a conventional weaving plan, leaving disconnections. These disconnections allow to deploy the portions of the blank intended to form the legs, in order to obtain the fibrous preform of the part to be produced.

However, it is found that in the parts obtained by this method, the edges of the junction between the base and the legs are essentially made of matrix and are not properly reinforced by the fibers, as illustrated in FIG. 1 at the areas Z1. Furthermore, the ends of the legs have unequal fiber lengths, some fibers extending beyond the end of the legs while a portion of the end of the legs is not properly reinforced by the fibers, some fibers not reaching the end of the legs, as illustrated in FIG. 1 at the area Z2. Finally, the operation of deploying the leg portions can generate excessive stresses on the stressed fibers located near the junction between the base and the legs. To overcome these problems, it is possible to cross the yarns at the bottom of the disconnections when weaving the blank. Such a solution is in particular proposed in document WO 2013/088040. Thus, crossing the yarns in the areas adjacent to the bottoms of the disconnections allows them to be reinforced, thus facilitating the deployment of the leg portions. Furthermore, these crossings of yarns allow the expansion of the fibrous blank to be increased at the junction between the base portion and the leg portions, which allows for complete filling of the junction between the base and the legs with fibers.

However, the multiple bends of the fibers, in particular at the two junctions, generate unwanted stresses in the fibers of the final part that belong to both the first leg and the second leg.

DISCLOSURE OF THE INVENTION

The main purpose of the present invention is therefore to overcome the aforementioned disadvantages by ensuring ease of shaping of the fibrous blank while limiting the stresses generated in the fibers of the final part.

To this end, the invention provides a fibrous blank produced in a single piece by three-dimensional weaving between a plurality of warp yarns extending in a longitudinal direction and a plurality of weft yarns extending in a transverse direction, the blank comprising at least one first disconnection extending in the longitudinal direction, the first disconnection extending from a first longitudinal edge of the fibrous blank and separating first and second woven portions in the blank, the blank further comprising a main woven portion without disconnection and located in the extension of the first and second woven portions in the longitudinal direction, the fibrous blank being characterized in that it has a first weaving plane in which at least a portion of the warp yarns of the first and second woven portions cross in the main woven portion in a crossing area adjacent to the first disconnection, and a second weaving plane different from the first weaving plane in which the warp yarns of the first and second woven portions do not cross in an area adjacent to the first disconnection, and in that the fibrous blank has an alternation between the first and second weaving planes in the transverse direction.

Thus, the fibrous blank according to the invention is particularly easy to shape to obtain a fibrous preform of the part to be produced, while limiting the stresses generated in the fibers.

Indeed, the crossings of the yarns of the first and second woven portions in the main woven portion make it easier to bend the first woven portion in relation to the second woven portion, or vice versa, because the change in trajectory of the warp yarns is less abrupt and corresponds more to the natural rigidity of the fibers. Furthermore, these yarn crossings allow to increase the expansion of the yarns in the main woven portion, which allows for more satisfactory fibrous reinforcement at the main woven portion in the final part.

The alternation of the two weaving planes allows for easy shaping of the fibrous blank and satisfactory fibrous reinforcement of the junctions between the first and second portions and the main portion. By alternating the weaving planes, friction between the yarns during weaving is limited by reducing the contact points. The congestion of the yarns within the fibrous blank is also limited, as is the rigidity of the blank, further facilitating its shaping.

Thus, in the second weaving plane, the warp yarns of the first woven portion extend in a first portion of an area of the main woven portion adjacent to the first disconnection and in which the warp yarns of the second woven portion extend in a second portion of the area of the main woven portion adjacent to the first disconnection, the first and second portions of the area of the main woven portion adjacent to the first disconnection being distinct.

According to a particular embodiment of the invention, all the warp yarns of the first and second woven portions cross in the main woven portion in the first weaving plane.

This ensures a particularly high fiber abundance in the main woven portion, and a relatively smooth trajectory for all the warp yarns in the final part.

Furthermore, by crossing all the warp yarns, the path lengths of each warp yarn are very similar, which allows for a consistent yarn length at the ends of the first and second portions in the final part.

According to another particular embodiment of the invention, the warp yarns of the first and second woven portions cross at most once in the main woven portion in the first weaving plane.

Thus, this limits the risk of damage to the yarns during weaving by reducing the contact points between the fibers. Furthermore, it is ensured that the warp yarns undergo a limited number of bends to limit the tensions generated in the fibers of the final part. By crossing the warp yarns only once, an optimal bend in the warp yarns is achieved, allowing a compromise between ease of shaping the blank and limiting the stresses in the fibers of the final part.

According to another particular embodiment of the invention, the first weaving plane comprises a plurality of successive weft columns $T_{5n}$ with n comprised between 1 and N in the main woven portion, the weft column $T_{51}$ being the weft column adjacent to the first disconnection, N corresponding to the number of warp yarns of the first woven portion crossing warp yarns of the second woven portion, so that in the weft column $T_{5n}$, n warp yarns of the first woven portion cross n warp yarns of the second woven portion.

According to another particular embodiment of the invention, the fibrous blank comprises a second disconnection extending from a second longitudinal edge of the fibrous blank and separating third and fourth woven portions in the blank, the main woven portion being present between the first and second woven portions on the one hand, and between the third and fourth woven portions on the other hand, at least a portion of the warp yarns of the third and fourth woven portions crossing in the main woven portion in a crossing area adjacent to the second disconnection in the second weaving plane.

This particular embodiment allows to produce a fibrous blank intended to be deployed to form a fibrous preform with a base from which two legs extend. Thus, the crossings of the yarns of the third and fourth woven portions in the main woven portion make it easier to bend the third woven portion relative to the fourth woven portion, or vice versa, in order to form one of the legs. The alternation of the two weaving planes allows to maintain easy shaping of the fibrous blank and satisfactory fibrous reinforcement of the junctions between the legs and the base of the final part, thanks to the alternating crossings between the warp yarns.

Preferably, all the warp yarns of the third and fourth woven portions intersect in the main woven portion in the second weaving plane. Thus, the path lengths of each warp yarn are very similar, which allows for a consistent yarn length at the ends of the legs in the final part.

Preferably, the warp yarns of the third and fourth woven portions cross at most once in the main woven portion in the second weaving plane. Indeed, it is desired to avoid, in the final part, the same fiber being present in both the first leg and the second leg, thus undergoing at least two significant bends and generating significant differences in fiber length at the ends of the legs.

According to another particular embodiment of the invention, the second weaving plane comprises a plurality of successive weft columns $T_{6n}$ with n comprised between 1 and N in the main woven portion, the weft column $T_{61}$ being the weft column adjacent to the second disconnection, N corresponding to the number of warp yarns of the third woven portion crossing warp yarns of the fourth woven portion, so that in the weft column $T_{6n}$, n warp yarns from the third woven portion cross n warp yarns of the fourth woven portion.

This ensures a regular crossing of the fibers in the crossing areas, in order to maximize the expansion while limiting the contact points between the fibers, which generate friction and unwanted stiffening of the blank.

According to another particular embodiment of the invention, the fibrous blank is intended to form the fibrous reinforcement of a n-shaped turbine ring sector. The fibrous blank may also be intended to form the fibrous reinforcement of a blade with one or more integrated platforms formed by means of disconnections, or the fibrous reinforcement of an aeronautical engine distributor.

According to a particular embodiment of the invention, each warp yarn of the first woven portion crossing a warp yarn of the second woven portion crosses all the warp yarns of the second woven portion crossing warp yarns of the first woven portion in the first weaving plane.

Conversely, each warp yarn of the second woven portion crossing a warp yarn of the first woven portion may cross all the warp yarns of the first woven portion crossing warp yarns of the second woven portion in the first weaving plane.

According to a particular embodiment of the invention, each warp yarn of the first woven portion crosses all the warp yarns of the second woven portion in the first weaving plane. Conversely, each warp yarn of the second woven portion can cross all the warp yarns of the first woven portion in the first weaving plane.

The invention also relates to a method for manufacturing a fibrous preform for a composite material part, the method comprising the following steps:

producing a fibrous blank according to the invention, shaping the fibrous blank so as to obtain the fibrous preform, said shaping comprising at least the deployment of the first or second woven portion.

In the case where the fibrous blank comprises two disconnections as described previously, the shaping of the fibrous blank may comprise the deployment of the third or fourth woven portion.

Furthermore, the invention relates to a method for manufacturing a part made of composite material comprising the following steps:

producing a fibrous preform in accordance with the method for manufacturing a fibrous preform according to the invention, and densifying said fibrous preform by a matrix to obtain the composite material part.

Preferably, the part produced is a part made of a ceramic matrix composite material of the CMC type or an organic matrix of the OMC type.

Finally, the invention relates to a use of the method for manufacturing a composite material part according to the invention, for the manufacture of a turbine ring sector. The invention may also relate to the use of the method for manufacturing a composite material part for the manufacture of a blade with one or more integrated platforms or a distributor.

BRIEF DESCRIPTION OF THE DRAWINGS

FIG. 1 is a diagram of a part obtained according to a prior art method, representing the organization of the fibers in the matrix.

FIG. 2 is a schematic illustration of a fibrous blank according to the invention.

FIG. 3 is a schematic sectional view of the fibrous blank of FIG. 2 representing the first weaving plane.

FIG. 4 is a schematic sectional view of the fibrous blank of FIG. 2 representing the second weaving plane.

FIG. 5 is a schematic view of a fibrous preform obtained by shaping the fibrous blank of FIG. 2.

FIG. 6 is a schematic sectional view of the fibrous preform of FIG. 5 in a rigid tool.

FIG. 7 is a schematic sectional view of the fibrous preform of FIG. 5 in a tool comprising a flexible membrane.

FIG. 8 is a schematic view of the part obtained by densification of the fibrous preform of FIG. 5.

FIG. 9 is a diagram of a part obtained according to the method of the invention, representing the organization of the fibers in the matrix.

DESCRIPTION OF THE EMBODIMENTS

FIGS. 2 to 4 schematically illustrate an example of a fibrous blank 100 according to the invention.

The fibrous blank 100 is produced by three-dimensional weaving between a plurality of layers of warp yarns and a plurality of layers of weft yarns. "Three-dimensional weaving" or "3D weaving" means here a weaving method by which at least some of the warp yarns bind the weft yarns over several weft layers. A reversal of roles between warp and weft is possible.

The fibrous blank may, for example, have a multi-satin weave, that is to say, a fabric obtained by three-dimensional weaving with several layers of weft yarns, the basic weave of each layer of which is equivalent to a conventional satin weave but with certain points of the weave that bind the layers of weft yarns together. The fibrous blank may also, for example, have an interlock weave, that is to say, a fabric obtained by three-dimensional weaving in which each layer of warp yarns binds several layers of weft yarns with all the yarns of the same warp column having the same movement in the plane of the weave. Other three-dimensional weaving methods are conceivable, such as, for example, weavings with a multi-plain weave. Different multi-layer weaving methods that can be used to form the fibrous blank are described in WO 2006/136755.

The fibrous blank 100 is preferably produced using a jacquard-type loom. Such a loom is for example described in document FR 3 047 744 A1.

The fibrous blank 100 extends in the warp direction along a longitudinal direction $D_L$ between a first longitudinal edge 100a and a second longitudinal edge 100b. The fibrous blank 100 extends in the weft direction along a transverse direction $D_T$ between a first transverse edge 100c and a second transverse edge 100d. The fibrous blank 100 extends in thickness along a thickness direction $D_E$ perpendicular to the longitudinal $D_L$ and transverse $D_T$ directions between a first surface 100e and a second surface 100f.

The fibrous blank 100 comprises at least one first disconnection 110 and one second disconnection 120 extending in the longitudinal $D_L$ and transverse $D_T$ directions. Preferably, the first disconnection 110 and the second disconnection 120 are present on the same plane perpendicular to the thickness direction $D_E$.

The first disconnection 110 extends in the longitudinal direction $D_L$ from the first longitudinal edge 100a of the fibrous blank 100 to a disconnection bottom 110a. The first disconnection 110 is open on the first longitudinal edge 100a, that is to say it opens onto the first longitudinal edge 100a of the fibrous blank 100. The first disconnection 110 extends in the transverse direction $D_T$ between the first transverse edge 100c and the second transverse edge 100d. Preferably, the first disconnection 110 is open onto the first transverse edge 100c and onto the second transverse edge 100d, that is to say it opens onto the first transverse edge 100c and onto the second transverse edge 100d.

The second disconnection 120 extends in the longitudinal direction $D_L$ from the second longitudinal edge 100b of the fibrous blank 100 to a disconnection bottom 120b. The second disconnection 120 is open onto the second longitudinal edge 100b, that is to say it opens onto the second longitudinal edge 100b of the fibrous blank 100. The second disconnection 120 extends in the transverse direction $D_T$ between the first transverse edge 100c and the second transverse edge 100d. Preferably, the second disconnection 120 is open onto the first transverse edge 100c and onto the second transverse edge 100d, that is to say it opens onto the first transverse edge 100c and onto the second transverse edge 100d.

The sum of the lengths of the first and second disconnections 110 and 120 along the longitudinal direction $D_L$ is less than the total length of the fibrous blank 100 along the direction $D_L$. Thus, the fibrous blank 100 comprises a main woven portion 105 not including any disconnection. The main woven portion 105 of the fibrous blank 100 extends in the longitudinal direction $D_L$ between the bottom 110a of the first disconnection 110 and the bottom 120b of the second disconnection 120. The main woven portion 105 of the fibrous blank 100 extends in the transverse direction $D_T$ between the first transverse edge 100c and the second transverse edge 100d of the fibrous blank 100. The main woven portion 105 of the fibrous blank 100 extends in the thickness direction $D_E$ between the first surface 100e and the second surface 100f of the fibrous blank 100.

The first disconnection 110 separates a first woven portion 101 and a second woven portion 102 of the fibrous blank 100. Thus, the first woven portion 101 of the fibrous blank 100 extends in the longitudinal direction $D_L$ between the first longitudinal edge 100a and the main woven portion 105 of the fibrous blank 100. The first woven portion 101 of the fibrous blank 100 extends in the thickness direction $D_E$ between the first surface 100e of the fibrous blank 100 and the first disconnection 110. Similarly, the second woven portion 102 of the fibrous blank 100 extends in the longitudinal direction $D_L$ between the first longitudinal edge 100a and the main woven portion 105 of the fibrous blank 100. The second woven portion 102 of the fibrous blank 100 extends in the thickness direction $D_E$ between the second surface 100f of the fibrous blank 100 and the first disconnection 110. Preferably, the first woven portion 101 and the second woven portion 102 of the fibrous blank 100 extend in the transverse direction $D_T$ between the first transverse edge 100c and the second transverse edge 100d of the fibrous blank 100. Preferably, the first and second woven portions 101 and 102 are only bonded to each other via the main woven portion 105.

The second disconnection 120 separates a third woven portion 103 and a fourth woven portion 104 of the fibrous blank 100. Thus, the third woven portion 103 of the fibrous blank 100 extends in the longitudinal direction $D_L$ between the second longitudinal edge 100b and the main woven portion 105 of the fibrous blank 100. The third woven portion 103 of the fibrous blank 100 extends in the thickness direction $D_E$ between the first surface 100e of the fibrous blank 100 and the second disconnection 120. Similarly, the fourth woven portion 104 of the fibrous blank 100 extends in the longitudinal direction $D_L$ between the second longitudinal edge 100b and the main woven portion 105 of the fibrous blank 100. The fourth woven portion 104 of the fibrous blank 100 extends in the thickness direction $D_E$ between the second surface 100f of the fibrous blank 100 and the second disconnection 120. Preferably, the third woven portion 103 and the fourth woven portion 104 of the fibrous blank 100 extend in the transverse direction $D_T$ between the first transverse edge 100c and the second transverse edge 100d of the fibrous blank 100. Preferably, the third and fourth woven portions 103 and 104 are only bonded to each other via the main woven portion 105.

The fibrous blank 100 comprises, along the transverse direction $D_T$, an alternation between a first weaving plane, illustrated schematically in FIG. 3, and a second weaving plane, illustrated schematically in FIG. 4. The first and second weaving planes are different. The first and second weaving planes of FIGS. 3 and 4 correspond to sections of the fibrous blank 100 illustrated in FIG. 2 along planes perpendicular to the transverse direction $D_T$, and schematically represent the weaving between the warp yarns and the weft yarns, and the crossings between the warp yarns. The weaving planes shown in FIGS. 3 and 4 are schematic diagrams, and therefore represent a number of warp yarns and a number of weft yarns that are lower than the actual numbers of warp yarns and weft yarns.

In the first weaving plane of the fibrous blank 100 illustrated in FIG. 3, first warp yarns $c_{11}$, $c_{12}$, $c_{13}$, $c_{14}$ bind together the weft yarns $t_1$ of the first woven portion 101 of the fibrous blank 100, and second warp yarns $c_{15}$, $c_{16}$, $c_{17}$, $c_{18}$ bind together the weft yarns $t_2$ of the second woven portion 102 of the fibrous blank 100. The first and second warp yarns $c_{11}$, $c_{12}$, $c_{13}$, $c_{14}$, $c_{15}$, $c_{16}$, $c_{17}$, $c_{18}$ then bind together the weft yarns $t_5$ and $t_6$ of the main woven portion 105.

In the example of the first weaving plane illustrated in FIG. 3, all the first warp yarns $c_{11}$, $c_{12}$, $c_{13}$, $c_{14}$ from the first woven portion 101 cross all the second warp yarns $c_{15}$, $c_{16}$, $c_{17}$, $c_{18}$ from the second woven portion 102. Thus, all the first or second warp yarns have a trajectory of length that is similar to the trajectories of the other first or second warp yarns, which allows for more regular filling of the ends of the legs of the final part with fibers. It is of course not outside the scope of the invention if only a portion of the first warp yarns $c_{11}$, $c_{12}$, $c_{13}$, $c_{14}$ from the first woven portion 101 cross the second warp yarns $c_{15}$, $c_{16}$, $c_{17}$, $c_{18}$ from the second woven portion 102, or if only a portion of the second warp yarns $c_{15}$, $c_{16}$, $c_{17}$, $c_{18}$ from the second woven portion 102 cross the first warp yarns $c_{11}$, $c_{12}$, $c_{13}$, $c_{14}$ from the first woven portion 101.

The first warp yarns $c_{11}$, $c_{12}$, $c_{13}$, $c_{14}$ from the first woven portion 101 and the second warp yarns $c_{15}$, $c_{16}$, $c_{17}$, $c_{18}$ from the second woven portion 102 cross in a first crossing area 105a of the main woven portion 105. The first crossing area

105a comprises at least in part a plurality of weft columns $T_{51}$, $T_{52}$, . . . . $T_{57}$ each comprising at least one crossing between a first warp yarn $c_{11}$, $c_{12}$, $c_{13}$, $c_{14}$ from the first woven portion 101 and a second warp yarn $c_{15}$, $c_{16}$, $c_{17}$, $c_{18}$ from the second woven portion 102. In particular, the first crossing area 105a extends in the longitudinal direction $D_L$ between on the one hand the weft column $T_{51}$ comprising at least one crossing closest to the first disconnection 110, that is to say closest to the bottom 110a of the disconnection 110, and on the other hand the weft column $T_{57}$ comprising at least one crossing closest to the second disconnection 120, that is to say closest to the bottom 120b of the disconnection 120, and therefore furthest from the first disconnection 110. The first crossing area 105a does not comprise all or part of a weft column located between the first disconnection 110 and the weft column $T_{51}$ closest to the first disconnection 110 comprising at least one crossing, and does not comprise all or part of a weft column located between the second disconnection 120 and the weft column $T_{57}$ closest to the second disconnection 120 comprising at least one crossing.

Preferably, the first crossing area 105a is limited to the reduced area of the main woven portion 105 in which each weft column $T_{51}$ to $T_{57}$ comprises at least one crossing between a first warp yarn $c_{11}$, $c_{12}$, $c_{13}$, $c_{14}$ from the first woven portion 101 and a second warp yarn $c_{15}$, $c_{16}$, $c_{17}$, $c_{18}$ from the second woven portion 102. Thus, each weft column $T_{51}$ to $T_{57}$ present at least in part in the first crossing area 105a comprises at least one crossing between a first warp yarn $c_{11}$, $c_{12}$, $c_{13}$, $c_{14}$ from the first woven portion 101 and a second warp yarn $c_{15}$, $c_{16}$, $c_{17}$, $c_{18}$ from the second woven portion 102.

In the example of the first weaving plane illustrated in FIG. 3, the first crossing area 105a of the main woven portion 105 is adjacent to the first disconnection 110, that is to say adjacent to the bottom 110a of the disconnection 110. In particular, this means that the end weft column $T_{51}$ of the main woven portion 105 closest to the first disconnection 110, that is to say closest to the bottom 110a of the disconnection 110, comprises at least one crossing between a first warp yarn $c_{11}$, $c_{12}$, $c_{13}$, $c_{14}$ from the first woven portion 101 and a second warp yarn $c_{15}$, $c_{16}$, $c_{17}$, $c_{18}$ from the second woven portion 102. Preferably, the weft columns $T_{61}$ to $T_{67}$ present in the main woven portion 105 closest to the second disconnection 120, that is to say to the bottom 120b of the second disconnection 120, do not have a crossing between a first warp yarn $c_{11}$, $c_{12}$, $c_{13}$, $c_{14}$ from the first woven portion 101 and a second warp yarn $c_{15}$, $c_{16}$, $c_{17}$, $c_{18}$ from the second woven portion 102.

Preferably, as illustrated in FIG. 3, each first warp yarn $c_{11}$, $c_{12}$, $c_{13}$, $c_{14}$ crossing a second warp yarn $c_{15}$, $c_{16}$, $c_{17}$, $c_{18}$ crosses each second warp yarn $c_{15}$, $c_{16}$, $c_{17}$, $c_{18}$ once. Conversely, each second warp yarn $c_{15}$, $c_{16}$, $c_{17}$, $c_{18}$ crossing a first warp yarn $c_{11}$, $c_{12}$, $c_{13}$, $c_{14}$ crosses each first warp yarn $c_{11}$, $c_{12}$, $c_{13}$, $c_{14}$ once.

Preferably, as illustrated in FIG. 3, the crossing of the first warp yarns $c_{11}$, $c_{12}$, $c_{13}$, $c_{14}$ from the first woven portion 101 with the second warp yarns $c_{15}$, $c_{16}$, $c_{17}$, $c_{18}$ from the second woven portion 102 is done regularly in the first weaving plane, by first crossing the warp yarns closest to the first disconnection 110, then by progressively crossing warp yarns increasingly further from the first disconnection 110. Thus, in the first weft column $T_{51}$ closest to the first disconnection 110 belonging to the first crossing area 105a, a single first warp yarn $c_{14}$ from the first portion 101 crosses a single second warp yarn $c_{15}$ from the second woven portion 102: the first warp yarn $c_{14}$ closest to the first disconnection 110 crosses the second warp yarn $c_{15}$ closest to the first disconnection 110. In the second weft column $T_{52}$ closest to the first disconnection 110 belonging to the first crossing area 105*a*, only two first warp yarns $c_{14}$, $c_{13}$ from the first portion 101 cross only two second warp yarns $c_{15}$, $c_{16}$ from the second woven portion 102: the first warp yarn $c_{14}$ crosses the second warp yarn $c_{16}$ and the first warp yarn $c_{13}$ crosses the second warp yarn $c_{15}$. In the third weft column $T_{53}$ closest to the first disconnection 110 belonging to the first crossing area 105*a*, only three first warp yarns $c_{14}$, $c_{13}$, $c_{12}$ from the first portion 101 cross only three second warp yarns $c_{15}$, $c_{16}$, $c_{17}$ from the second woven portion 102: the first warp yarn $c_{14}$ crosses the second warp yarn $c_{17}$, the first warp yarn $c_{13}$ crosses the second warp yarn $c_{16}$ and the first warp yarn $c_{12}$ crosses the second warp yarn $c_{15}$.

Generally, $T_{5n}$ denotes the n-th weft column of the main portion 105 closest to the first disconnection 110 for n comprised between 1 and N included, N being the number of first yarns $c_{11}$, $c_{12}$, $c_{13}$, $c_{14}$ crossing second yarns $c_{15}$, $c_{16}$, $c_{17}$, $c_{18}$ in the first crossing area 105*a* or N being the number of second yarns $c_{15}$, $c_{16}$, $c_{17}$, $c_{18}$ crossing first yarns $c_{11}$, $c_{12}$, $c_{13}$, $c_{14}$ in the first crossing area 105*a*. In the example illustrated in FIG. 3, the number N has the value 4. Thus, in each column $T_{5n}$, n first warp yarns from the first woven portion 101 cross n second warp yarns from the second woven portion 102. In the example illustrated in FIG. 3, for n=N, there are in the fourth column $T_{54}$ 4 first warp yarns $c_{11}$, $c_{12}$, $c_{13}$, $c_{14}$ from the first woven portion 101 which cross 4 second warp yarns $c_{15}$, $c_{16}$, $c_{17}$, $c_{18}$ from the second woven portion 102.

Furthermore, in each column $T_{5n}$, the first warp yarn $c_{1\ N-i}$ crosses the second warp yarn $c_{1\ N+n-i}$ for i comprised between 0 and n−1 included. Thus, in the example illustrated in FIG. 3, in column $T_{52}$, that is to say n=2, the increment i=0 clearly indicates that the first warp yarn $c_{1\ 4-0}$, that is to say $c_{14}$, crosses the second warp yarn $c_{1\ 4+2-0}$, that is to say $c_{16}$, and the increment i=1 clearly indicates that the first warp yarn $c_{1\ 4-1}$, that is to say $c_{13}$, crosses the second warp yarn $c_{1\ 4+2-1}$, that is to say $c_{15}$.

Once the weft column $T_{5N}$ is reached, which corresponds to the column $T_{54}$ in FIG. 3, the number of yarn crossings per weft column decreases regularly until the end of the first crossing area 105*a* furthest from the first disconnection 110. $T_{5\ N+m}$ denotes the (N+m)-th weft column of the main portion 105 closest to the first disconnection 110 for m comprised between 1 and N−1 included, N being the number of first yarns $c_{11}$, $c_{12}$, $c_{13}$, $c_{14}$ crossing second yarns $c_{15}$, $c_{16}$, $c_{17}$, $c_{18}$ in the first crossing area 105*a* or N being the number of second yarns $c_{15}$, $c_{16}$, $c_{17}$, $c_{18}$ crossing first yarns $c_{11}$, $c_{12}$, $c_{13}$, $c_{14}$ in the first crossing area 105*a*. Thus, in each column $T_{5\ N+m}$, N−m first warp yarns from the first woven portion cross N−m second warp yarns from the second woven portion. In the example illustrated in FIG. 3, for m=2, there are in column $T_{56}$ 2 first warp yarns $c_{11}$, $c_{12}$ from the first woven portion 101 which cross 2 second warp yarns $c_{17}$, $c_{18}$ from the second woven portion 102.

Preferably, in the first weaving plane, the first warp yarns $c_{11}$, $c_{12}$, $c_{13}$, $c_{14}$ from the first woven portion 101 having been crossed with second warp yarns $c_{15}$, $c_{16}$, $c_{17}$, $c_{18}$ from the second woven portion 102 bind together the weft yarns $t_4$ of the fourth woven portion 104 of the fibrous blank 100 and do not bind the weft yarns $t_3$ of the third woven portion 103 of the fibrous blank 100, in order to limit the curvatures of these first warp yarns $c_{11}$, $c_{12}$, $c_{13}$, $c_{14}$ which have been crossed. For the same reasons, preferably, the second warp yarns $c_{15}$, $c_{16}$, $c_{17}$, $c_{18}$ from the second woven portion 102 having been crossed with first warp yarns $c_{11}$, $c_{12}$, $c_{13}$, $c_{14}$ from the first woven portion 101 bind together the weft yarns $t_3$ of the third woven portion 103 of the fibrous blank 100 and do not bind the weft yarns $t_4$ of the fourth woven portion 104 of the fibrous blank 100.

In the second weaving plane of the fibrous blank 100 illustrated in FIG. 4, third warp yarns $c_{21}$, $c_{22}$, $c_{23}$, $c_{24}$ bind together the weft yarns $t_3$ of the third woven portion 103 of the fibrous blank 100, and fourth warp yarns $c_{25}$, $c_{26}$, $c_{27}$, $c_{28}$ bind together the weft yarns $t_4$ of the fourth woven portion 104 of the fibrous blank 100. The third and fourth warp yarns $c_{21}$, $c_{22}$, $c_{23}$, $c_{24}$, $c_{25}$, $c_{26}$, $c_{27}$, $c_{28}$ then bind together the weft yarns $t_5$ and $t_6$ of the main woven portion 105.

In the example of the second weaving plane illustrated in FIG. 4, all the third warp yarns $c_{21}$, $c_{22}$, $c_{23}$, $c_{24}$ from the third woven portion 103 cross all the fourth warp yarns $c_{25}$, $c_{26}$, $c_{27}$, $c_{28}$ from the fourth woven portion 104. Thus, all the third or fourth warp yarns have a trajectory of length that is similar to the trajectories of the other third or fourth warp yarns, which allows for more regular filling of the ends of the legs of the final part with fibers. It is of course not outside the scope of the invention if only a portion of the third warp yarns $c_{21}$, $c_{22}$, $c_{23}$, $c_{24}$ from the third woven portion 103 cross the fourth warp yarns $c_{25}$, $c_{26}$, $c_{27}$, $c_{28}$ from the fourth woven portion 104, or if only a portion of the fourth warp yarns $c_{25}$, $c_{26}$, $c_{27}$, $c_{28}$ from the fourth woven portion 104 cross the third warp yarns $c_{21}$, $c_{22}$, $c_{23}$, $c_{24}$ from the third woven portion 103.

The third warp yarns $c_{21}$, $c_{22}$, $c_{23}$, $c_{24}$ from the third woven portion 103 and the fourth warp yarns $c_{25}$, $c_{26}$, $c_{27}$, $c_{28}$ from the fourth woven portion 104 cross in a second crossing area 105*b* of the main woven portion 105. The second crossing area 105*b* comprises at least in part a plurality of weft columns $T_{61}$, $T_{62}$, . . . . $T_{67}$ each comprising at least one crossing between a third warp yarn $c_{21}$, $c_{22}$, $c_{23}$, $c_{24}$ from the third woven portion 103 and a fourth warp yarn $c_{25}$, $c_{26}$, $c_{27}$, $c_{28}$ from the fourth woven portion 104. In particular, the second crossing area 105*b* extends in the longitudinal direction $D_L$ between on the one hand the weft column $T_{61}$ comprising at least one crossing closest to the second disconnection 120, that is to say closest to the bottom 120*b* of the disconnection 120, and on the other hand the weft column $T_{67}$ comprising at least one crossing closest to the first disconnection 110, that is to say closest to the bottom 110*a* of the disconnection 110, and therefore furthest from the second disconnection 120. The second crossing area 105*b* does not comprise all or part of a weft column located between the second disconnection 120 and the weft column $T_{61}$ closest to the second disconnection 120 comprising at least one crossing, and does not comprise all or part of a weft column located between the first disconnection 110 and the weft column $T_{67}$ closest to the first disconnection 110 comprising at least one crossing.

Preferably, the second crossing area 105*b* is limited to the reduced area of the main woven portion 105 in which each weft column $T_{61}$ to $T_{67}$ comprises at least one crossing between a third warp yarn $c_{21}$, $c_{22}$, $c_{23}$, $c_{24}$ from the third woven portion 103 and a fourth warp yarn $c_{25}$, $c_{26}$, $c_{27}$, $c_{28}$ from the fourth woven portion 104. Thus, each weft column $T_{61}$ to $T_{67}$ present at least in part in the second crossing area 105*b* comprises at least one crossing between a third warp yarn $c_{21}$, $c_{22}$, $c_{23}$, $c_{24}$ from the third woven portion 103 and a fourth warp yarn $c_{25}$, $c_{26}$, $c_{27}$, $c_{28}$ from the fourth woven portion 104.

In the example of a second weaving plane illustrated in FIG. 4, the second crossing area 105*b* of the main woven portion 105 is adjacent to the second disconnection 120, that is to say adjacent to the bottom 120*b* of the disconnection 120. In particular, this means that the end weft column $T_{61}$ of the main woven portion 105 closest to the second disconnection 120, that is to say closest to the bottom 120b of the disconnection 120, comprises at least one crossing between a third warp yarn $c_{21}$, $c_{22}$, $c_{23}$, $c_{24}$ from the third woven portion 103 and a fourth warp yarn $c_{25}$, $c_{26}$, $c_{27}$, $c_{28}$ from the fourth woven portion 104. Preferably, the weft columns $T_{51}$ to $T_{57}$ present in the main woven portion 105 closest to the first disconnection 110, that is to say to the bottom 110a of the first disconnection 110, do not have a crossing between a third warp yarn $c_{21}$, $c_{22}$, $c_{23}$, $c_{24}$ from the third woven portion 103 and a fourth warp yarn $c_{25}$, $c_{26}$, $c_{27}$, $c_{28}$ from the fourth woven portion 104.

Preferably, as illustrated in FIG. 4, each third warp yarn $c_{21}$, $c_{22}$, $c_{23}$, $c_{24}$ crossing a fourth warp yarn $c_{25}$, $c_{26}$, $c_{27}$, $c_{28}$ crosses each fourth warp yarn $c_{25}$, $c_{26}$, $c_{27}$, $c_{28}$ once. Conversely, each fourth warp yarn $c_{25}$, $c_{26}$, $c_{27}$, $c_{28}$ crossing a third warp yarn $c_{21}$, $c_{22}$, $c_{23}$, $c_{24}$ crosses each third warp yarn $c_{21}$, $c_{22}$, $c_{23}$, $c_{24}$ once.

Preferably, as illustrated in FIG. 4, the crossing of the third warp yarns $c_{21}$, $c_{22}$, $c_{23}$, $c_{24}$ from the third woven portion 103 with the fourth warp yarns $c_{25}$, $c_{26}$, $c_{27}$, $c_{28}$ from the fourth woven portion 104 is done regularly in the second weaving plane, by first crossing the warp yarns closest to the second disconnection 120, then by progressively crossing warp yarns increasingly further from the second disconnection 120. Thus, in the first weft column $T_{61}$ closest to the second disconnection 120 belonging to the second crossing area 105b, a single third warp yarn $c_{24}$ from the third portion 103 crosses a single fourth warp yarn $c_{25}$ from the fourth woven portion 104: the third warp yarn $c_{24}$ closest to the second disconnection 120 crosses the fourth warp yarn $c_{25}$ closest to the second disconnection 120. In the second weft column $T_{62}$ closest to the second disconnection 120 belonging to the second crossing area 105b, only two third warp yarns $c_{24}$, $c_{23}$ from the third portion 103 cross only two fourth warp yarns $c_{25}$, $c_{26}$ from the fourth woven portion 104: the third warp yarn $c_{24}$ crosses the fourth warp yarn $c_{26}$ and the third warp yarn $c_{23}$ crosses the fourth warp yarn $c_{25}$. In the third weft column $T_{63}$ closest to the second disconnection 120 belonging to the second crossing area 105b, only three third warp yarns $c_{24}$, $c_{23}$, $c_{22}$ from the third portion 103 cross only three fourth warp yarns $c_{25}$, $c_{26}$, $c_{27}$ from the fourth woven portion 104: the third warp yarn $c_{24}$ crosses the fourth warp yarn $c_{27}$, the third warp yarn $c_{23}$ crosses the fourth warp yarn $c_{26}$ and the third warp yarn $c_{22}$ crosses the fourth warp yarn $c_{25}$.

Generally, $T_{6n}$ denotes the n-th weft column of the main portion 105 closest to the second disconnection 120 for n comprised between 1 and N included, N being the number of third yarns $c_{21}$, $c_{22}$, $c_{23}$, $c_{24}$ crossing fourth yarns $c_{25}$, $c_{26}$, $c_{27}$, $c_{28}$ in the second crossing area 105b or N being the number of fourth yarns $c_{25}$, $c_{26}$, $c_{27}$, $c_{28}$ crossing third yarns $c_{21}$, $c_{22}$, $c_{23}$, $c_{24}$ in the second crossing area 105b. In the example illustrated in FIG. 4, the number N has the value 4. Thus, in each column $T_{6n}$, n first warp yarns from the third woven portion 103 cross n fourth warp yarns from the fourth woven portion 104. In the example illustrated in FIG. 4, for n=N, there are in the fourth column $T_{64}$ 4 first warp yarns $c_{21}$, $c_{22}$, $c_{23}$, $c_{24}$ from the third woven portion 103 which cross 4 fourth warp yarns $c_{25}$, $c_{26}$, $c_{27}$, $c_{28}$ from the fourth woven portion 104.

Furthermore, in each column $T_{6n}$, the third warp yarn $c_{2\ N-i}$ crosses the fourth warp yarn $c_{2\ N+n-i}$ for i comprised between 0 and n−1 included. Thus, in the example illustrated in FIG. 4, in column $T_{62}$, that is to say n=2, the increment i=0 clearly indicates that the third warp yarn $c_{2\ 4-0}$, that is to say $c_{24}$, crosses the fourth warp yarn $c_{2\ 4+2-0}$, that is to say $c_{26}$, and the increment i=1 clearly indicates that the third warp yarn $c_{2\ 4-1}$, that is to say $c_{23}$, crosses the fourth warp yarn $c_{2\ 4+2-1}$, that is to say $c_{25}$.

Once the weft column $T_{6N}$ is reached, which corresponds to the column $T_{64}$ in FIG. 4, the number of yarn crossings per weft column decreases regularly until the end of the second crossing area 105b furthest from the second disconnection 120. $T_{6\ N+m}$ denotes the (N+m)-th weft column of the main portion 105 closest to the second disconnection 120 for m comprised between 1 and N−1 included, N being the number of third yarns $c_{21}$, $c_{22}$, $c_{23}$, $c_{24}$ crossing fourth yarns $c_{25}$, $c_{26}$, $c_{27}$, $c_{28}$ in the second crossing area 105b or N being the number of fourth yarns $c_{25}$, $c_{26}$, $c_{27}$, $c_{28}$ crossing third yarns $c_{21}$, $c_{22}$, $c_{23}$, $c_{24}$ in the second crossing area 105b. Thus, in each column $T_{6\ N+m}$, N−m third warp yarns from the third woven portion cross N−m fourth warp yarns from the fourth woven portion. In the example illustrated in FIG. 4, for m=2, there are in column $T_{66}$ 2 third warp yarns $c_{21}$, $c_{22}$ from the third woven portion 103 which cross 2 fourth warp yarns $c_{27}$, $c_{28}$ from the fourth woven portion 104.

Preferably, in the second weaving plane, the third warp yarns $c_{21}$, $c_{22}$, $c_{23}$, $c_{24}$ from the third woven portion 103 having been crossed with fourth warp yarns $c_{25}$, $c_{26}$, $c_{27}$, $c_{28}$ from the fourth woven portion 102 bind together the weft yarns $t_2$ of the second woven portion 102 of the fibrous blank 100 and do not bind the weft yarns $t_1$ of the first woven portion 101 of the fibrous blank 100, in order to limit the curvatures of these third warp yarns $c_{21}$, $c_{22}$, $c_{23}$, $c_{24}$ which have been crossed. For the same reasons, preferably, the fourth warp yarns $c_{25}$, $c_{26}$, $c_{27}$, $c_{28}$ from the fourth woven portion 104 having been crossed with third warp yarns $c_{21}$, $c_{22}$, $c_{23}$, $c_{24}$ from the third woven portion 103 bind together the weft yarns $t_1$ of the first woven portion 101 of the fibrous blank 100 and do not bind the weft yarns $t_2$ of the second woven portion 102 of the fibrous blank 100.

Preferably, the first plane and the second weaving plane are alternated regularly along the transverse direction $D_T$, in order to facilitate the future shaping of the fibrous blank 100 over its entire width along the transverse direction $D_T$. It is of course not outside the scope of the invention if the first plane and the second weaving plane are alternated irregularly along the transverse direction $D_T$. Preferably, a first weaving plane never immediately follows another first weaving plane along the transverse direction $D_T$. Preferably, a second weaving plane never immediately follows another second weaving plane along the transverse direction $D_T$.

Preferably, there is no crossing between the warp yarns in the first, second, third and fourth woven portions 101, 102, 103 and 104, in order to limit the curvatures and tensions in the fibers belonging to the fibrous blank 100.

Preferably, the fibrous blank 100 according to the invention does not comprise a layer exit, which means that the sum of the number of layers of warp yarns in the first portion 101 and the number of layers of warp yarns in the second portion 102 corresponds to the number of layers of warp yarns in the main portion 105, and corresponds to the sum of the number of layers of warp yarns in the third portion 103 and the number of layers of warp yarns in the fourth portion 104.

Preferably, the fibrous blank 100 corresponds to a "dry" fibrous texture, that is to say not impregnated with a resin or the like. The fibrous blank 100 may include a plurality of yarns of various types, in particular ceramic or carbon yarns or a mixture of such yarns. Preferably, the fibrous blank 100 may be made from silicon carbide fibers. Generally, the fibrous blank 100 may also be made from fibers made of the following materials: alumina, mullite, silica, an aluminosilicate, a borosilicate, carbon, or a mixture of several of these materials.

The fibrous blank 100 thus obtained is then shaped in order to obtain a fibrous preform 10, as illustrated in FIG. 5, by separating the first and second woven portions 101 and 102 by means of the first disconnection 110 and by separating the third and fourth woven portions 103 and 104 by means of the second disconnection 120. This shaping operation is greatly simplified on the one hand by means of the crossings of warp yarns in the main woven portion 105 near the bottom 110a and 120b of the disconnections 110 and 120 and on the other hand by means of the alternation of the location of the crossing area 105a or 105b of the main woven portion 105 between the first and second weaving planes.

In the example illustrated in FIGS. 5 to 9, it is desired to produce a part 1 in the shape of a π (pi), comprising a base 2 from which a first leg 3 and a second leg 4 extend. The part 1 is preferably a turbine ring sector, or an inter-blade platform. It is of course not outside the scope of the invention if it is desired to produce another composite material part from a fibrous blank according to the invention.

Thus, in order to form a fibrous preform 30 of the first leg 3, intended to form the fibrous reinforcement of said first leg 3, the first woven portion 101 of the fibrous blank 100 is deployed to arrange it perpendicular to the second woven portion 102 and to the main woven portion 105. In order to form a fibrous preform 40 of the second leg 4, intended to form the fibrous reinforcement of said second leg 4, the third woven portion 103 of the fibrous blank 100 is deployed to arrange it perpendicular to the fourth woven portion 104 and to the main woven portion 105. Finally, a fibrous preform 20 of the base 2 is formed by the second woven portion 102, the fourth woven portion 104 and the main woven portion 105 of the fibrous blank 100.

The fibrous preform 10 illustrated in FIG. 5 thus comprises the base preform 20, the preform of the first leg 30 extending from the base preform 20 and the preform of the second leg 40 extending from the base preform 20.

Preferably, the length and width of the base preform 20, the length of the leg preforms 30 and 40, and the spacing between the two leg preforms 30 and 40 of the fibrous preform 10 correspond substantially respectively to the length and width of the base 2, to the length of the legs 3 and 4, and to the spacing between the two legs 3 and 4 of the part 1 to be obtained, illustrated schematically in FIG. 8.

Once the fibrous preform 10 has been obtained, said preform 10 is densified by a matrix to obtain the part 1 comprising a fibrous reinforcement constituted by the preform 10.

The fibrous preform can be consolidated or densified in a well-known manner by gas means by chemical vapor infiltration of the matrix, called "CVI". The fibrous preform corresponding to the fibrous reinforcement of the part to be produced is placed in an oven into which a reaction gas phase is admitted. The pressure and temperature prevailing in the oven and the composition of the gas phase are chosen so as to allow the diffusion of the gas phase within the porosity of the preform to form at least part of the matrix by deposition, at the heart of the material in contact with the fibers, of a solid material resulting from a decomposition of a constituent of the gas phase or a reaction between several constituents, unlike the pressure and temperature conditions specific to CVD methods ("Chemical Vapor Deposition") which lead exclusively to a deposition on the surface of the material. The formation of a SiC matrix can be obtained with methyltrichlorosilane (MTS) giving SiC by decomposition of the MTS.

A densification combining gas and liquid routes can be used in a well-known manner to facilitate implementation and limit costs and manufacturing cycles while obtaining satisfactory characteristics for the intended use. In this configuration, a consolidation of the fibrous preform is carried out by gas as described above, then an impregnation of the fibrous preform is carried out with a suspension or slip ("slurry cast") containing for example SiC particles and organic binders, followed by infiltration with liquid silicon ("melt infiltration"). The densification can be carried out in a well-known manner by resin injection molding, or "Resin Transfer Molding" (abbreviated "RTM"), or by injection molding of a suspension, or "Slurry Transfer Molding" (abbreviated "STM"). As in the example illustrated in FIG. 6, the fibrous preform 10, previously consolidated by gas or not, is arranged in a cavity defined by a first part 61 and a second part 62 of a mold 60. The cavity has the shape of the part to be manufactured, the latter having at least generally the shape of the part 1 to be manufactured.

Conventionally, a slip 6 loaded with matrix precursor particles or a resin is injected into the cavity receiving the fibrous preform 10, in order to pass through said fibrous preform 10 by applying a pressure gradient P. The mold 6 into which the injection of the slip 6 is carried out comprises a filter 63 at the outlet orifice of the slip 6 in the mold 60, thus allowing to retain any matrix precursor particles in the mold 60 and to impregnate the fibrous preform 10 as the matrix precursor particles are deposited in the mold 60 in the case of a slip.

Densification can also be achieved in a well-known manner by membrane injection, as illustrated in FIG. 7. This injection mode allows complete control of the quantity of resin or slip injected, thus ensuring a precise and suitable fiber volume ratio. Consequently, the mechanical characteristics of the part thus manufactured are improved, with low variability from one part to another.

The fibrous preform 10 intended to form the fibrous reinforcement of the part 1 is arranged in a mold 70. In particular, the fibrous preform 10 can be arranged directly on the lower face of the impregnation chamber 71. This lower face of the impregnation chamber 71 can comprise a filter (not shown in FIG. 7).

The mold 70 comprises on the one hand an impregnation chamber 71 in which the fibrous preform 10 is arranged in order to be densified by a matrix by the injection of an impregnation fluid 8, and on the other hand a compaction chamber 72 in which a compression fluid 9 is injected in order to apply pressure to the preform 10 during its densification by the matrix. The impregnation chamber 71 and the compaction chamber 72 are separated by a flexible membrane 73. The membrane 73 allows to apply pressure to the fibrous preform 10 installed in the impregnation chamber 71, the compression fluid 9 applying a pressure Q to the membrane 73 which deforms and thus in turn applies pressure to the fibrous preform 10.

Preferably, and as illustrated in FIG. 7, the membrane fits the leg preforms 30 and 40 of the fibrous preform 10 and the surface of the base preform 20 located between the leg preforms 30 and 40, while the surface of the base preform 20 opposite the leg preforms 30 and 40 rests against one of the walls of the impregnation chamber 71, opposite the membrane 73. An insert 74 can be used to facilitate the impregnation of the fibrous preform 10 of the part 1. As shown in FIG. 7, it is possible, for example, to inject a resin

8 through an inlet opening into the impregnation chamber 71, and to inject the compression liquid 9 through an inlet opening into the compaction chamber 72.

Depending on the size, thickness and shape of the part 1 to be manufactured, a different injection sequence for the compression and impregnation fluids will be preferred.

The compression fluid, for example water, is injected into the compaction chamber so as to exert pressure on the flexible membrane. The flexible membrane thus applies pressure to the fibrous preform, allowing the impregnation fluid to penetrate into said preform.

The preform is then subjected to heat treatment while the pressure exerted by the membrane is maintained, in order to form a matrix in the porosities of the fibrous preform.

When the densification step is completed, a composite material part 1 is obtained, as illustrated in FIGS. 8 and 9, the fibrous reinforcement of which is constituted by the fibrous preform 10 and the shape of which corresponds generally to the part 1 to be manufactured. A trimming or light machining step can be carried out on the part produced to obtain the part 1 to be produced. Furthermore, other elements can be mounted or welded onto the part produced to obtain the part 1 to be produced.

The part obtained may be a part made of ceramic matrix composite (CMC) or organic matrix composite (OMC). Preferably, the composite part obtained is a part made of ceramic matrix composite (CMC) of the SiC/SiC type.

FIG. 9 illustrates the distribution of the fibers in the matrix in the part obtained by the method of the invention, the fibers crossing in area Z3 and not crossing in area Z4. As illustrated in FIG. 9 at area Z5, the fibers of the part 1 obtained fill the angles between the base 2 and the legs 3 and 4 well. The improvement compared to a part obtained according to the method of the prior art, as illustrated in FIG. 1, is notable.

The expression "comprised between . . . and . . . " must be understood as including the limits.

The invention claimed is:

1. A fibrous blank produced in a single piece by three-dimensional weaving between a plurality of warp yarns extending in a longitudinal direction and a plurality of weft yarns extending in a transverse direction, the blank comprising at least one first disconnection extending in the longitudinal direction, the first disconnection extending from a first longitudinal edge of the fibrous blank and separating first and second woven portions in the blank, the blank further comprising a main woven portion without disconnection and located in an extension of the first and second woven portions in the longitudinal direction, wherein the fibrous blank has a first weaving plane in which at least a portion of the warp yarns of the first and second woven portions cross in the main woven portion in a crossing area adjacent to the first disconnection, and a second weaving plane different from the first weaving plane in which the warp yarns of the first and second woven portions do not cross in an area adjacent to the first disconnection, and wherein the fibrous blank has an alternation between the first and second weaving planes in the transverse direction.

2. The fibrous blank according to claim 1, wherein all warp yarns of the first and second woven portions intersect in the main woven portion in the first weaving plane.

3. The fibrous blank according to claim 1, wherein the warp yarns of the first and second woven portions cross at most once in the main woven portion in the first weaving plane.

4. The fibrous blank according to claim 1, wherein the first weaving plane comprises a plurality of successive weft columns $T_{5n}$ with n comprised between 1 and N in the main woven portion, the weft column $T_{51}$ being the weft column adjacent to the first disconnection, N corresponding to the number of warp yarns of the first woven portion crossing warp yarns of the second woven portion, so that in the weft column $T_{5n}$, n warp yarns of the first woven portion cross n warp yarns of the second woven portion.

5. The fibrous blank according to claim 1, the fibrous blank comprising a second disconnection extending from a second longitudinal edge of the fibrous blank and separating third and fourth woven portions in the blank, the main woven portion being present between the first and second woven portions on the one hand, and between the third and fourth woven portions on the other hand, at least a portion of the warp yarns of the third and fourth woven portions crossing in the main woven portion in a crossing area adjacent to the second disconnection in the second weaving plane.

6. The fibrous blank according to claim 5, wherein the second weaving plane comprises a plurality of successive weft columns $T_{6n}$ with n comprised between 1 and N in the main woven portion, the weft column $T_{61}$ being the weft column adjacent to the second disconnection, N corresponding to the number of warp yarns of the third woven portion crossing warp yarns of the fourth woven portion, so that in the weft column $T_{6n}$, n warp yarns from the third woven portion cross n warp yarns of the fourth woven portion.

7. The fibrous blank according to claim 5, the fibrous blank being intended to form the fibrous reinforcement of a π-shaped turbine ring sector.

8. The fibrous blank according to claim 1, wherein each warp yarn of the first woven portion crossing a warp yarn of the second woven portion crosses all the warp yarns of the second woven portion crossing warp yarns of the first woven portion in the first weaving plane.

9. The fibrous blank according to claim 1, wherein each warp yarn of the first woven portion crosses all the warp yarns of the second woven portion in the first weaving plane.

10. A method for manufacturing a fibrous preform for a composite material part, the method comprising:

producing a fibrous blank (100) according to claim 1, shaping the fibrous blank (100) so as to obtain the fibrous preform, said shaping comprising at least the deployment of the first or second woven portion.

11. A method for manufacturing a part made of composite material comprising:

producing a fibrous preform in accordance with the method for manufacturing a fibrous preform according to claim 10, and densifying said fibrous preform by a matrix to obtain the composite material part.

12. A method comprising carrying out the method according to claim 11, for manufacturing a turbine ring sector.

* * * * *